United States Patent
Huang

(10) Patent No.: US 7,801,025 B2
(45) Date of Patent: Sep. 21, 2010

(54) METHOD AND SYSTEM FOR IMPLEMENTING STANDBY

(75) Inventor: Shikui Huang, Guangdong (CN)

(73) Assignee: Huawei Technologies Co., Ltd., Shenzhen, Guangdong (CN)

( * ) Notice: Subject to any disclaimer, the term of this patent is extended or adjusted under 35 U.S.C. 154(b) by 423 days.

(21) Appl. No.: 11/766,873

(22) Filed: Jun. 22, 2007

(65) Prior Publication Data

US 2008/0008087 A1    Jan. 10, 2008

Related U.S. Application Data

(63) Continuation of application No. PCT/CN2006/001525, filed on Jun. 30, 2006.

(30) Foreign Application Priority Data

Jul. 4, 2005    (CN)    ......................... 2005 1 0080376

(51) Int. Cl.
*H04J 1/16*    (2006.01)
(52) U.S. Cl. ....................... 370/217; 370/220
(58) Field of Classification Search ........................ None
See application file for complete search history.

(56) References Cited

U.S. PATENT DOCUMENTS

| | | | |
|---|---|---|---|
| 5,214,692 A | 5/1993 | Chack et al. | |
| 6,256,293 B1 * | 7/2001 | Gerstel et al. | ................ 370/228 |
| 2002/0024697 A1 * | 2/2002 | Maeno | ........................ 359/124 |
| 2004/0137897 A1 * | 7/2004 | Teixeira | ...................... 455/423 |

FOREIGN PATENT DOCUMENTS

| | | |
|---|---|---|
| CN | 1547330 | 11/2004 |
| WO | 01/33896 A1 | 5/2001 |
| WO | WO03/107606 | 12/2003 |
| WO | WO2004/036800 | 4/2004 |

OTHER PUBLICATIONS

European Search Report; dated Jul. 4, 2008; Application No./Patent No. 06753080.8-1237/ 1821457 PCT/CN2006001525.

* cited by examiner

*Primary Examiner*—Huy D Vu
*Assistant Examiner*—Benjamin Lamont
(74) *Attorney, Agent, or Firm*—Ladas & Parry LLP

(57) ABSTRACT

A system and a method for improving communication reliability include: in normal working status, an access layer device communicating with a user terminal through a primary working link; when a failure of the primary working link between the access layer device and the user terminal is detected, switching the working link to a standby working link established by the AMDF. Using the scheme above, port standby of a line card and line card standby are implemented, and the intermitting time for serving is shortened, thus the system reliability is improved. In addition, the frame of the scheme is explicit, and the implementation is simple.

12 Claims, 4 Drawing Sheets

METHOD AND SYSTEM FOR IMPLEMENTING STANDBY

FIELD OF THE INVENTION

The present invention relates to the communication field, and more particularly, relates to a method and a system for improving communication reliability.

BACKGROUND OF THE INVENTION

To improve communication reliability, it is necessary for improving quality of service of communication system and establishing standbys for communication system or backup for communication data.

The networking structure of an existing communication access network is shown in FIG. 1. The communication access network includes: a user terminal, an access layer device, a transfer device and a convergence layer device.

The access layer device connects with the convergence layer device via the transfer device. The connection of the access layer device and the user terminal is generally shown in FIG. 2 including setting a Main Distribution Frame (MDF) between the access layer device and the user terminal, and the MDF is responsible for the jumper connection between the access device and a subscriber line.

The user terminal such as telephone terminal, dialing Modem and Asymmetrical Digital Subscriber Loop (ADSL) Modem, is located nearby the subscriber side. The user terminal is responsible for transferring various signals of a subscriber to the access layer device.

The access layer device is responsible for receiving various signals transferred by the user terminal, converting the various signals into signals that can be handled by the system, and transmitting the signals to the convergence layer device at the network side via the transfer device.

The access layer device may include a narrowband access device, a broadband access device and an integrated access device which are different in functions. The narrowband access device is developed earliest. The narrowband access device provides access functions of such services as Plain Old Telephone Service (POTS), Integrated Services Digital Network (ISDN) and sub-rate link. The broadband access device is developed lately. The broadband access device may be a Digital Subscriber Line Access Multiplexer (DSLAM). And the DSLAM includes an Asynchronous Transfer Mode (ATM) DSLAM and an Internet Protocol (IP) DSLAM. The DSLAM connects a subscriber and a network through xDSL access technique, and the uplink interface thereof is respectively an ATM interface and an IP interface. The integrated access device is an inter-grade device form between the narrowband access device and the broadband access device. The integrated access device each provides access functions for narrowband services and broadband services simultaneously.

The convergence layer device is responsible for converging various data of the subscriber and transferring the data to a core network.

A failure may occur in a line card of the access layer device, for example a port of the line card is in failure or the whole line card is in failure. When one port of the line card is in failure, other ports may still function. For the failure mode, manufacturers set forth the concepts of 'N+1' port standby and 'N+1' card standby.

For the 'N+1' port standby, if a port of the line card is in failure, switch the subscriber service of the port to a standby port of the line card which replaces the port to continue the work, so the continuity of service is guaranteed.

For the 'N+1' card standby, if a card of the access layer device is in failure and is unable to serve, an Element Management System (EMS) switches all the subscribers of the card including subscriber lines and subscriber data to a standby line card of the EMS to enable the subscribers to continue enjoying services.

In an existing solution, the 'N+1' card standby is implemented by integrating a relay matrix on a card of the splitting box (SPL box) which is equipped externally, and the implementation scheme includes:

defining a set of standby buses on a backplane, connecting all subscriber line interfaces of the card to the standby buses via the relay matrix, outputting the standby buses via a specific standby line card to implement the standby function.

As can be seen from the above technical scheme, the 'N+1' card standby needs the SPL box, which limits the application.

In another existing solution, the 'N+1' port standby is implemented through the relay matrix integrated on the line card, and the implementation scheme includes: forming a standby channel by internally or externally testing the relay matrix on the line card, and implementing the 'N+1' port standby function.

As can be seen from the above technical scheme of the existing art, only the 'N+1' port standby is implemented; the implementation of the 'N+1' card standby requires that signals of all ports of a line card should be connect to a standby line card from the backplane via connectors, the amount of connectors and the layer of the backplane is great, which makes the 'N+1' card standby difficult to be implemented.

SUMMARY OF THE INVENTION

Embodiments of the present invention provide a system and a method for improving the communication reliability, which are able to implement the port standby of the line card and the line card standby, so as to reduce the time for serving terminals by the system, thereby improving the system reliability.

A method for improving communication reliability includes:

in normal working status, an access layer device communicating with a user terminal through a primary working link;

when a failure of the primary working link between the access layer device and the user terminal is detected, switching the primary working link to a standby working link between the access layer device and the user terminal established via an Automated Main Distribution Frame (AMDF).

A system for improving communication reliability includes:

an AMDF, configured to establish a primary working link and a standby working link;

an access layer device, connected with a first side of the AMDF; and a user terminal, connected with a second side of the AMDF; and in normal working status, the access layer device communicating with the user terminal through the primary working link;

when the primary working link is in failure, the access layer device communicating with the user terminal through the standby working link.

An AMDF includes one or more components for:

establishing a primary working link between an access layer device and a user terminal;

establishing a standby working link between the access layer device and the user terminal;

switching from the primary working link to the standby working link when the primary working link is in failure.

As can be seen from the technical solution above, in normal working status, the access layer device communicates with the user terminal through the primary working link; when a failure of the primary working link between the access layer device and the user terminal is detected, the primary working link is switched to the standby working link established by the AMDF. Using the scheme above, port standby function of the line card and the line card standby function are implemented, and the intermitting time for serving is shortened, thus the system reliability is improved. In addition, the frame of the scheme is explicit, and the implementation is simple.

DETAILED DESCRIPTION OF THE INVENTION

Embodiments of the present invention provide a system and a method for improving communication reliability including, in normal working status, an access layer device communicates with a user terminal through a primary working link; when a failure of the primary working link between the access layer device and the user terminal is detected, establishing a standby working link by an Automated Main Distribution Frame (AMDF), and switching the working link to the standby working link.

Figure 1:
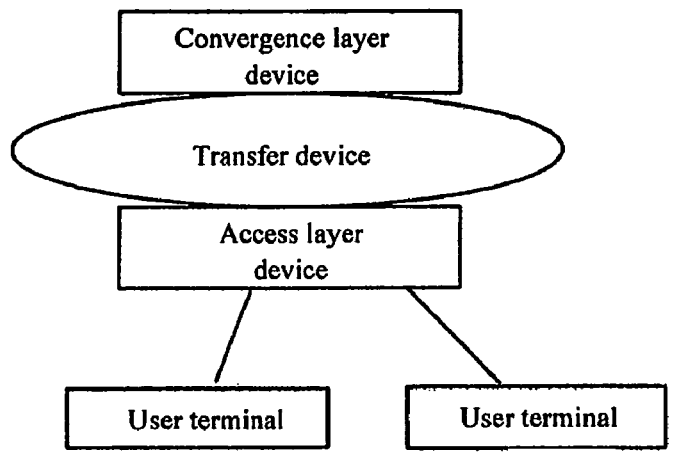
FIG. 1 is a schematic diagram illustrating the networking structure of a communication access network.
Figure 2:
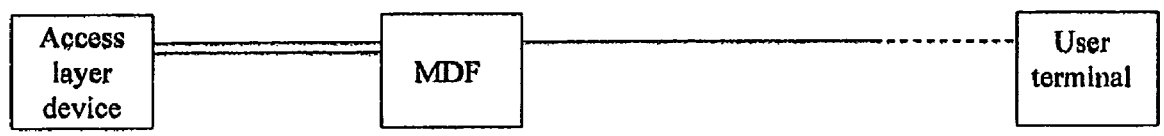
FIG. 2 is a schematic diagram illustrating connection between an access layer device and a user terminal.
Figure 3:
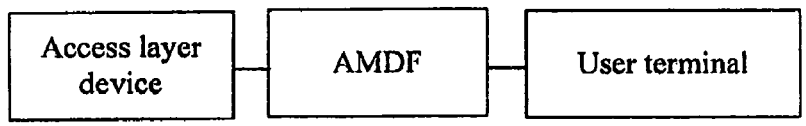
FIG. 3 is a schematic diagram according to an embodiment of the present invention.

Referring to FIG. 3, the system according to an embodiment of the present invention includes: an access layer device, a user terminal and an AMDF. The access layer device and the AMDF may be integrated, for example integrated in one cabinet or independent physically.

The access layer device includes a narrowband access device, a broadband access device and an integrated access device.

Figure 4:
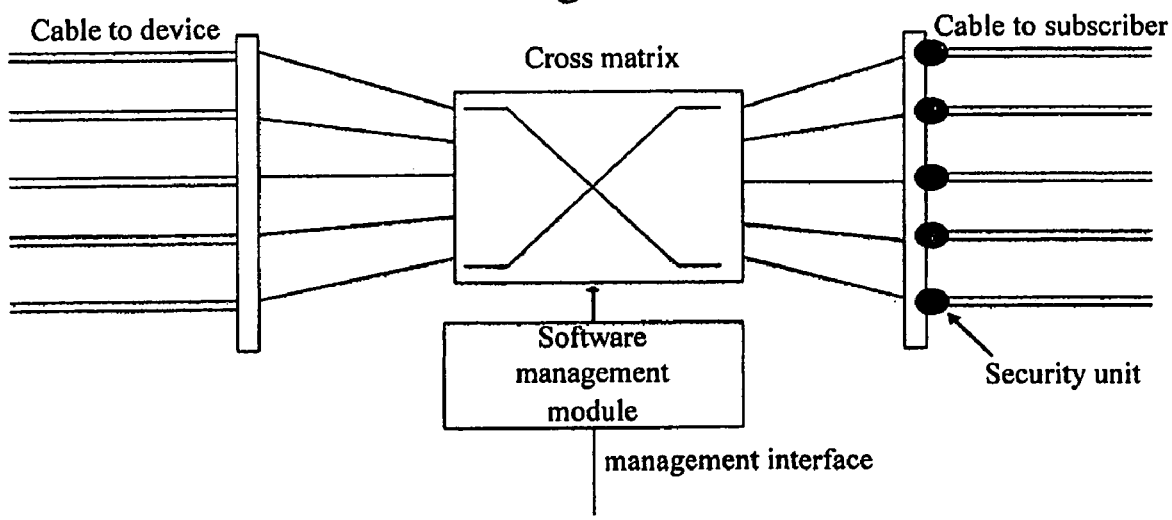
FIG. 4 is a schematic diagram of the AMDF implementation according to an embodiment of the present invention.

The AMDF is developed based on the MDF, and the working principle of the AMDF includes: implementing line distribution between an external line module and an internal line module through a configurable cross network under the management of software, and the line distribution in original MDF is implemented by manual, so the AMDF implements configuration automatically instead of manually. The implementation schematic diagram is shown in FIG. 4. A first side of the AMDF connects with the access layer device and a second side connects with the user terminal. Fast connection between the access layer device and the user terminal may be implemented by the AMDF under the management of a software management module at the management interface.

Figure 5:
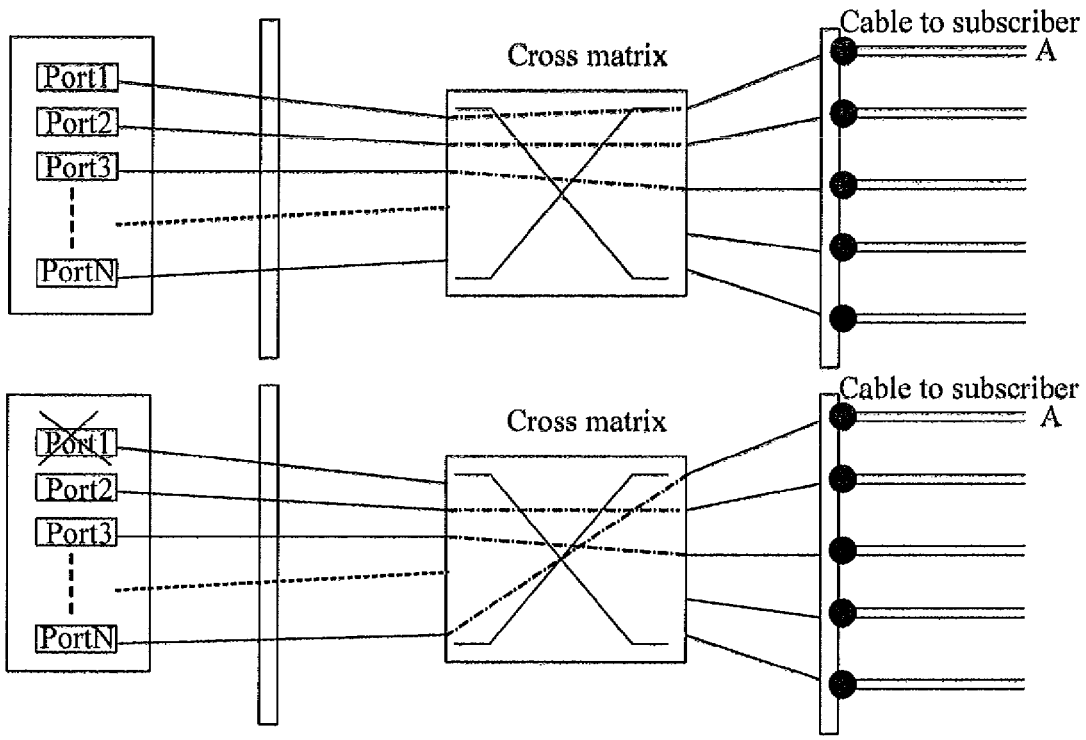
FIG. 5 is a schematic diagram of the port standby of the line card according to an embodiment of the present invention.

If the port standby of a line card is needed, as shown in FIG. 5, a primary working port and a standby working port of a line card in the access layer device are connected to a first side of the AMDF and a user terminal is connected to a second side of the AMDF; a primary working link between the primary working port and the user terminal is established via the AMDF, for example, in FIG. 5, the primary working link between Port 1 and Subscriber A is established within the AMDF.

In normal working status, the access layer device communicates with the user terminal through the primary working link.

When a failure of the primary working link between the access layer device and the user terminal is detected, the AMDF, under the management of the access layer device or an Element Management System (EMS), removes the primary working link and establishes the standby working link between Port N and the user terminal, switches the primary working link to the standby working link, configures the configuration data associated with the primary working link on the standby working link, and initiates the standby working link for working.

As shown in FIG. 5, if Port 1 of the line card is in failure, the EMS manages the AMDF to remove the primary working link of Subscriber A, connects the working link of Subscriber A to Port N, and configures configuration data associated with Port 1 on Port N; so the port standby is implemented, and Subscriber A is able to continue enjoying the service of Port N.

Figure 6:
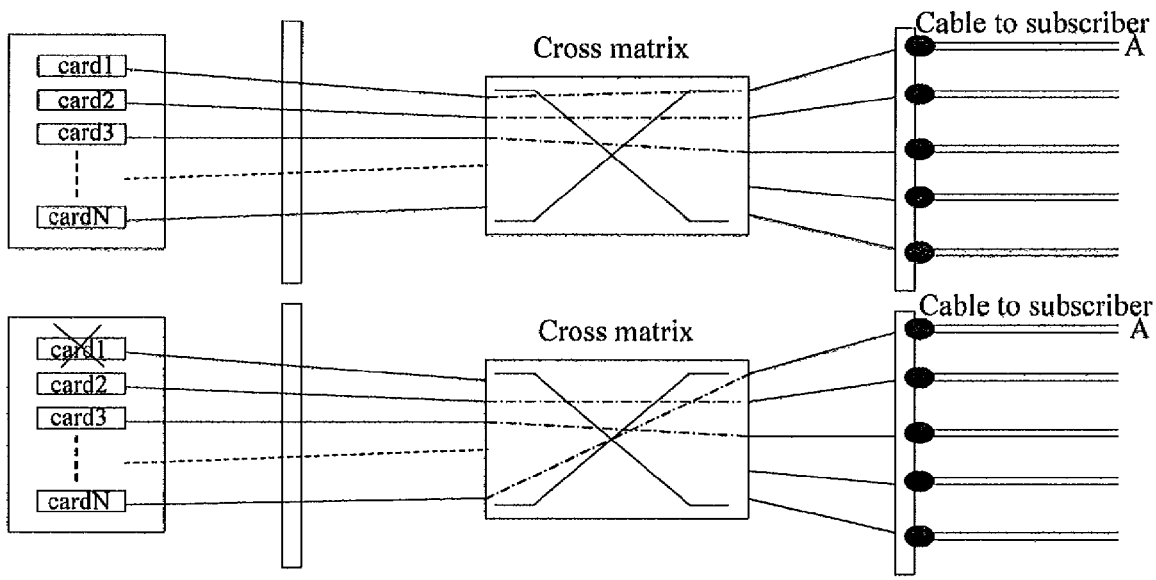
FIG. 6 is a schematic diagram of the line card standby according to an embodiment of the present invention.

If the line card standby is needed, as shown in FIG. 6, the primary line card and the standby line card of the access layer device are connected to a first side of the AMDF and the user terminal is connected to a second side of the AMDF; a primary working link between the primary line card and the user terminal is established via the AMDF.

In normal working status, the access layer device communicates with the user terminal through the primary working link. As shown in FIG. 6, in normal condition, the EMS manages the primary working link between Card 1 and Subscriber group A via a software interface within the AMDF, and Subscriber group A enjoys the service provided by Card 1.

When a failure of the primary working link between the access layer device and a user terminal is detected, the AMDF, under the management of the access layer device or the EMS, removes the primary working link and establishes the standby working link between Card N and the user terminal, switches the primary working link to the standby working link, configures the configuration data associated with the primary working link on the standby working link, and initiates the standby working link for working.

As shown in FIG. 6, if Card 1 is in failure, the EMS exits from serving status. The EMS manages the AMDF to remove the primary working link between Card 1 and Subscriber group A, connects Subscriber group A to Card N which is standby, switches the primary working link to the standby working link, configures the configuration data associated with Card 1 on Card N, and eventually initiates the service of Card N. In this way, Subscriber group A is able to continue enjoying services.

The method according to the embodiment of the present invention includes: setting an AMDF between an access layer device and a user terminal, and establishing a primary working link between the access layer device and the user terminal via the AMDF; in normal working status, the access layer device communicates with the user terminal through the primary working link; when a failure of the primary working link between the access layer device and the user terminal is detected, managing the AMDF to switch the primary working link to a standby working link by the access layer device or by an EMS. Detailed implementation process will be given in embodiments of the present invention.

Figure 7:
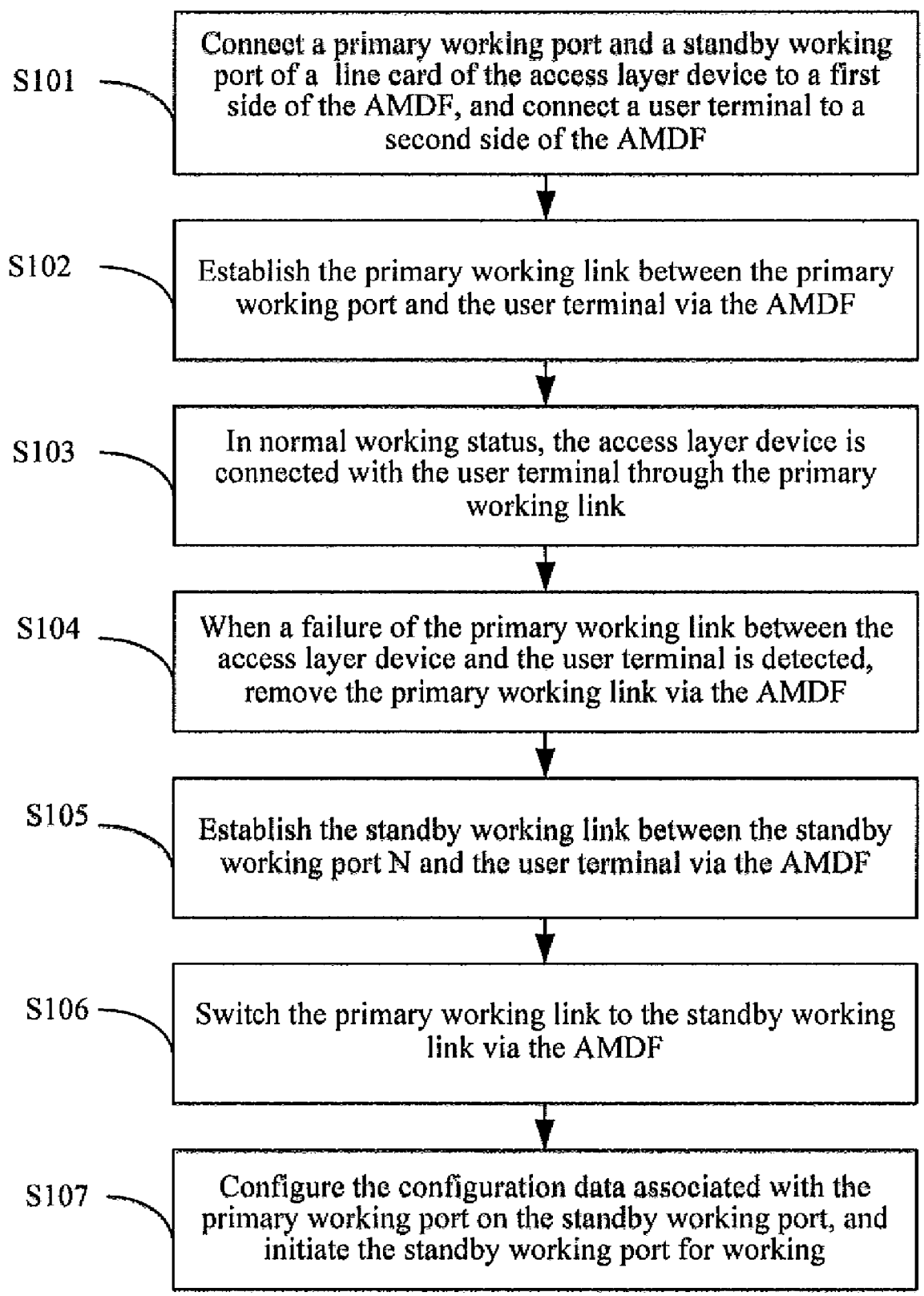
FIG. 7 is a flowchart according to an embodiment of the present invention.

As shown in FIG. 7, the method according to an embodiment of the present invention includes the following steps.

Step S101: connecting a primary working port and a standby working port of a line card of the access layer device to a first side of an AMDF, and connecting a user terminal to a second side of the AMDF.

Step S102: establishing a primary working link between the primary working port and the user terminal via the AMDF.

Step S103: in normal working status, the access layer device communicates with the user terminal through the primary working link.

Step S104: when a failure of the primary working link between the access layer device and the user terminal is detected, removing the primary working link via the AMDF.

The step S104 includes two situations.

In a first situation, in normal working status, the access layer device performs failure detection automatically; when a failure of the primary working link between the access layer device and the user terminal is detected, remove the primary working link by the AMDF under the management of the access layer device or an EMS;

In a second situation, perform failure detection manually, when a failure of the primary working link is detected, remove the primary working link by the AMDF under the management of the access layer device or the EMS.

Step S105: establishing a standby working link between the standby working port, such as Port N, and the user terminal via the AMDF.

Step S106: switching the primary working link to the standby working link via the AMDF.

Step S107: configuring the configuration data associated with the primary working link on the standby working link, and initiating the standby working link for working; i.e., configuring the configuration data associated with the primary working port on the standby working port, and initiating the standby working port for working.

Figure 8:
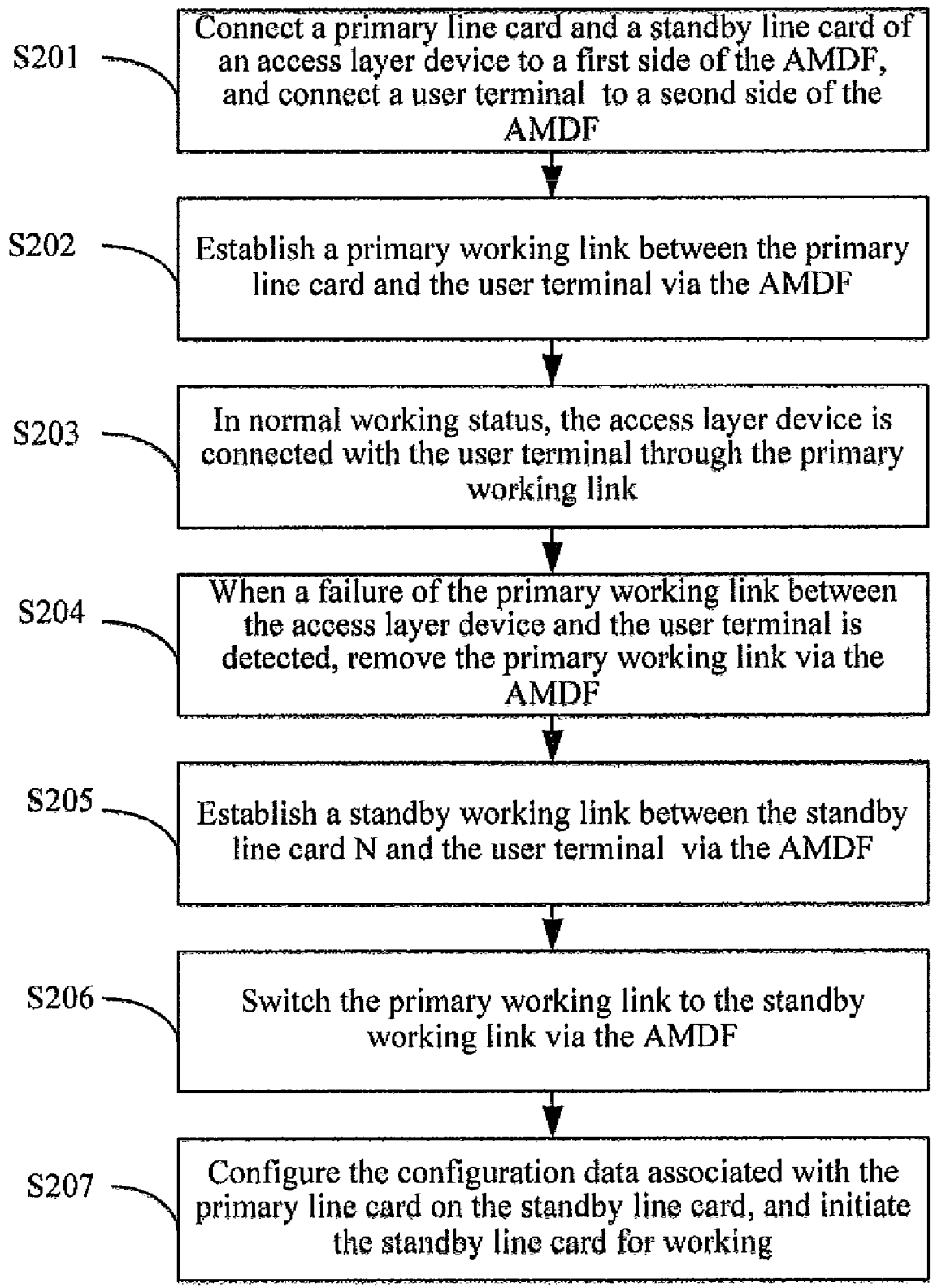
FIG. 8 is a flowchart according to an embodiment of the present invention.

As shown in FIG. 8, the method according to an embodiment of the present invention includes the following steps.

Step S201: connecting a primary line card and a standby line card of an access layer device to a first side of an AMDF, and connecting a user terminal to a second side of the AMDF.

Step S202: establishing a primary working link between the primary line card and the user terminal via the AMDF.

Step S203: in normal working status, the access layer device communicates with the user terminal through the primary working link.

Step S204: when a failure of the primary working link between the access layer device and the user terminal is detected, removing the primary work link by the AMDF under the management of the access layer device or an EMS.

The step S204 includes two situations.

In a first situation, in normal working status, the access layer device performs failure detection automatically; when a failure of the primary working link between the access layer device and the user terminal is detected, remove the primary working link by the AMDF under the management of the access layer device or the EMS;

In a second situation, perform failure detection manually, if a failure of the primary working link is detected, remove the primary working link by the AMDF under the management of the access layer device or the EMS.

Step S205: establishing a standby working link between Card N and the user terminal via the AMDF.

Step S206: switching the primary working link to the standby working link via the AMDF.

Step S207: configuring the configuration data associated with the primary working link on the standby working link, and initiating the standby working link for working, i.e. configuring the configuration data associated with the primary line card on the standby line card, and initiating the standby line card for working.

The schemes according to the embodiments may be used independently, and also may be used simultaneously; that is to say, an 'N+1' standby may be implemented for the port of a line card and a line card simultaneously. For example, when a failure of the primary working link between the primary working port and the user terminal is detected, the link is switched according to the procedure described in the embodiment of FIG. 7; when a failure of the primary working link between the primary line card and the user terminal is detected, the link is switched according to the procedure described in the embodiment of FIG. 8.

As can be seen from the above detailed implementation solution of the present invention, after setting an AMDF between the access layer device and the user terminal, when the AMDF and the access layer device work together, the port standby function of a line card and the line card standby function are implemented using the port switching function of AMDF, thus the intermitting time for serving is reduced, and reliability of the system is improved. In addition, the frame of the scheme of the present invention is explicit, and the implementation is simple.

The foregoing is only preferred embodiments of the present invention. The protection scope of the present invention, however, is not limited to the above description. Any change or substitution, within the technical scope disclosed by the present invention, easily occurring to those skilled in the art should be covered by the protection scope of the present invention. Therefore, the protection scope of the present invention should be compatible with the protection scope stated by claims.

I claim:

1. A method for improving communication reliability, comprising:
    connecting a primary line card and a standby line card of an access layer device to a first side of an Automated Main Distribution Frame, AMDF;
    connecting a user terminal to a second side of the AMDF;
    establishing a primary working link between the primary line card and the user terminal via the AMDF;
    in normal working status, the access layer device communicating with the user terminal through the primary working link;
    when a failure of the primary working link between the access layer device and the user terminal is detected, establishing a standby working link between the standby line card and the user terminal via the AMDF, switching the primary working link to the standby working link between the access layer device and the user terminal established via the AMDF.

2. The method of claim 1, wherein the switching the primary working link to the standby working link comprises:
    switching the primary working link to the standby working link by the AMDF under the management of the access layer device.

3. The method of claim 1, wherein the switching the primary working link to the standby working link comprises:
    switching the primary working link to the standby working link by the AMDF under the management of an Element Management System (EMS).

4. The method of claim 1, wherein the switching the primary working link to the standby working link comprises:

removing the primary working link via the AMDF; and
switching the primary working link to the standby working link via the AMDF.

5. The method of claim 4, further comprising:
when a failure of the primary working link is detected, removing the primary working link via the AMDF.

6. The method of claim 4, wherein the switching the primary working link to the standby working link via the AMDF comprises:
configuring configuration data associated with the primary line card on the standby line card, and initiating the standby line card for working.

7. The method of claim 1, wherein the access layer device comprises: a narrowband access device, a broadband access device and an integrated access device.

8. A system for improving communication reliability, comprising:
an access layer device, connected with a first side of an Automated Main Distribution Frame, AMDF;
a user terminal, connected with a second side of the AMDF; and
the AMDF configured to establish a primary working link between a primary line card of the access layer device and the user terminal and a standby working link between a standby line card of the access layer device and the user terminal;
wherein
in normal working status, the access layer device communicates with the user terminal through the primary working link;
when the primary working link is in failure, the access layer device communicates with the user terminal through the standby working link.

9. The system of claim 8, wherein the access layer device and the AMDF are integrated or independent physically.

10. A method for improving communication reliability, comprising:
connecting a primary working port and a standby working port of a line card of an access layer device to a first side of an Automated Main Distribution Frame, AMDF;
connecting a user terminal to a second side of the AMDF;
establishing a primary working link between the primary working port and the user terminal via the AMDF;
in normal working status, the access layer device communicating with the user terminal through the primary working link;
when a failure of the primary working link between the access layer device and the user terminal is detected, establishing a standby working link between the standby working port and the user terminal via the AMDF, switching the primary working link to the standby working link between the access layer device and the user terminal established via the AMDF.

11. The method of claim 10, wherein the switching the primary working link to the standby working link via the AMDF comprises:
configuring configuration data associated with the primary working port on the standby working port, and initiating the standby working port for working.

12. A system for improving communication reliability, comprising:
an access layer device, connected with a first side of an Automated Main Distribution Frame, AMDF;
a user terminal, connected with a second side of the AMDF; and
the AMDF, configured to establish a primary working link between a primary working port of a line card of the access layer device and the user terminal and a standby working link between a standby working port of the line card of the access layer device and the user terminal;
wherein
in normal working status, the access layer device communicates with the user terminal through the primary working link;
when the primary working link is in failure, the access layer device communicates with the user terminal through the standby working link.

* * * * *